United States Patent
Sundareswaran et al.

(10) Patent No.: US 9,177,096 B2
(45) Date of Patent: Nov. 3, 2015

(54) TIMING CLOSURE USING TRANSISTOR SIZING IN STANDARD CELLS

(71) Applicants: Savithri Sundareswaran, Austin, TX (US); James A. Tuvell, Cedar Park, TX (US)

(72) Inventors: Savithri Sundareswaran, Austin, TX (US); James A. Tuvell, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 27 days.

(21) Appl. No.: 14/226,555

(22) Filed: Mar. 26, 2014

(65) Prior Publication Data

US 2015/0278425 A1 Oct. 1, 2015

(51) Int. Cl.
*G06F 17/50* (2006.01)

(52) U.S. Cl.
CPC ........ *G06F 17/5081* (2013.01); *G06F 2217/84* (2013.01)

(58) Field of Classification Search
CPC ............ G06F 17/5031; G06F 17/5045; G06F 17/5081; G06F 17/5068; G06F 2217/84
See application file for complete search history.

(56) References Cited

U.S. PATENT DOCUMENTS

| | | | |
|---|---|---|---|
| 5,726,903 A * | 3/1998 | Kerzman et al. | 716/103 |
| 7,546,560 B2 | 6/2009 | Dirks et al. | |
| 7,743,355 B2 | 6/2010 | Zhou et al. | |
| 8,255,851 B1 * | 8/2012 | Baransy et al. | 716/113 |
| 8,612,915 B1 * | 12/2013 | Sundareswaran et al. | 716/122 |
| 8,713,506 B2 * | 4/2014 | Zahn et al. | 716/122 |
| 2006/0206845 A1 * | 9/2006 | Rao et al. | 716/6 |
| 2007/0106967 A1 * | 5/2007 | Inoue et al. | 716/4 |
| 2008/0040698 A1 * | 2/2008 | Ferrari et al. | 716/6 |
| 2009/0289696 A1 * | 11/2009 | Lewis et al. | 327/534 |
| 2010/0070933 A1 * | 3/2010 | Quach | 716/2 |
| 2010/0169846 A1 * | 7/2010 | Gupta et al. | 716/2 |
| 2010/0169847 A1 * | 7/2010 | Gupta et al. | 716/2 |
| 2010/0229138 A1 * | 9/2010 | Nonaka | 716/6 |
| 2011/0006840 A1 * | 1/2011 | Chen | 327/564 |
| 2012/0198394 A1 * | 8/2012 | Pikus et al. | 716/53 |
| 2012/0274357 A1 * | 11/2012 | Klass | 326/102 |
| 2012/0290994 A1 * | 11/2012 | Mbouombouo et al. | 716/108 |
| 2013/0069703 A1 * | 3/2013 | Gasper et al. | 327/264 |
| 2013/0104092 A1 * | 4/2013 | Buck et al. | 716/113 |
| 2013/0305194 A1 * | 11/2013 | Wang et al. | 716/52 |
| 2015/0089463 A1 * | 3/2015 | Kuo et al. | 716/106 |

FOREIGN PATENT DOCUMENTS

KR 200879509 1/2009

OTHER PUBLICATIONS

Jun Seomun et al., "Skewed Flip-Flop and Mixed-Vt Gates for Minimizing Leakage in Sequential Circuits," IEEE Transactions on Computer-Aided Design of Integrated Circuits and Systems, vol. 27, No. 11, Nov. 2008, 13 pages.

* cited by examiner

*Primary Examiner* — Nha Nguyen
(74) *Attorney, Agent, or Firm* — VanLeeuwen & VanLeeuwen; Jonathan N. Gold (57) ABSTRACT

An approach is provided in which a design tool executes static timing analysis of an integrated circuit design using a first set of timing values corresponding to a first set of layout properties of a transistor included in a standard cell utilized by the integrated circuit design. When the design tool determines that the static timing analysis generates a timing violation within a violation budget, the design tool selects a second set of timing values of the standard cell corresponding to a second set of layout properties of the transistor. The design tool determines that re-execution of the static timing analysis using the second set of timing values resolves the timing violation and, in turn, generates mask layer data that includes the second set of layout properties.

19 Claims, 8 Drawing Sheets

TIMING CLOSURE USING TRANSISTOR SIZING IN STANDARD CELLS

TECHNICAL FIELD

The present disclosure relates to resolving integrated circuit design timing violations using standard cell resize timing values and resize layout properties corresponding to influential transistors in a standard cell.

BACKGROUND

Integrated circuit design involves the creation of electronic components, such as transistors, resistors, capacitors and the metallic interconnect of these components onto a piece of a semiconductor, such as silicon. A typical standard cell based design cycle involves multiple stages such as system specification, architectural design, functional/logic design, circuit design, physical design, physical verification, and fabrication.

The main steps of the physical design stage are floor planning, logic synthesis, placement, clock insertion, routing, and tape out. Placement involves instantiating design component geometric representations (objects) onto a layout area. In practice, the physical design stage is not a straightforward progression and considerable iteration is required to ensure all design objectives (timing, power, area, etc.) are met concurrently.

During timing closure of a standard cell based design, several optimization iterations may be required to resolve a few final setup and hold timing violations. Common design practices include inserting a large number of buffers to resolve hold violations, or replacing standard cells with similar cells that have increased drive-strength to resolve setup violations. Both of these design practices, however, increase the overall layout area requirement of the integrated circuit.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

This disclosure describes a design tool that first creates resize timing values and resize layout properties corresponding to influential transistors residing on a standard cell's clock/data paths without increasing the overall layout area of the standard cell. The design tool then executes static timing analysis of an integrated circuit design, which includes the standard cell, using a first set of timing values (e.g., default timing values) corresponding to a first set of layout properties (e.g., default layout properties) of the influential transistors included in the standard cell. If the design tool determines that the standard cell generates a timing violation during the static timing analysis that falls within a violation budget (setup/hold tolerances), the design tool selects a second set of timing values (resize timing values) corresponding to a second set of layout properties (resize layout properties) of the influential transistors. In turn, the design tool determines that re-execution of the static timing analysis using the second set of timing values resolves the timing violation and, as such, generates mask layer data that includes the second set of layout properties.

Transistor timing depends upon transistor drive strength, which depends upon transistor sizing (e.g., gate-width/length size). Standard cells are designed based upon varying degrees of specified drive strength that defines how much load a standard cell can drive. These different drive strengths are achieved using different transistor sizes within the standard cells. An increase in drive strength results in reduced timing delay. As the specified drive strength changes, the transistor sizes are changed, resulting in a change in timing delay. For example, increasing a transistor's gate-width decreases timing delay, and increasing the transistor's gate-length increases timing delay (e.g., reduces the saturation current through the transistor resulting in a requirement to charge the output longer to reach the same voltage level). As discussed in more detail below, this disclosure resizes, by a small amount (e.g., ~10%), a few influential transistors in a standard cell to incrementally change timing delays within the standard cell. In turn, these incremental changes adjust the standard cell's skew between clock paths and data paths, resulting in reduced timing violations.

Figure 1:
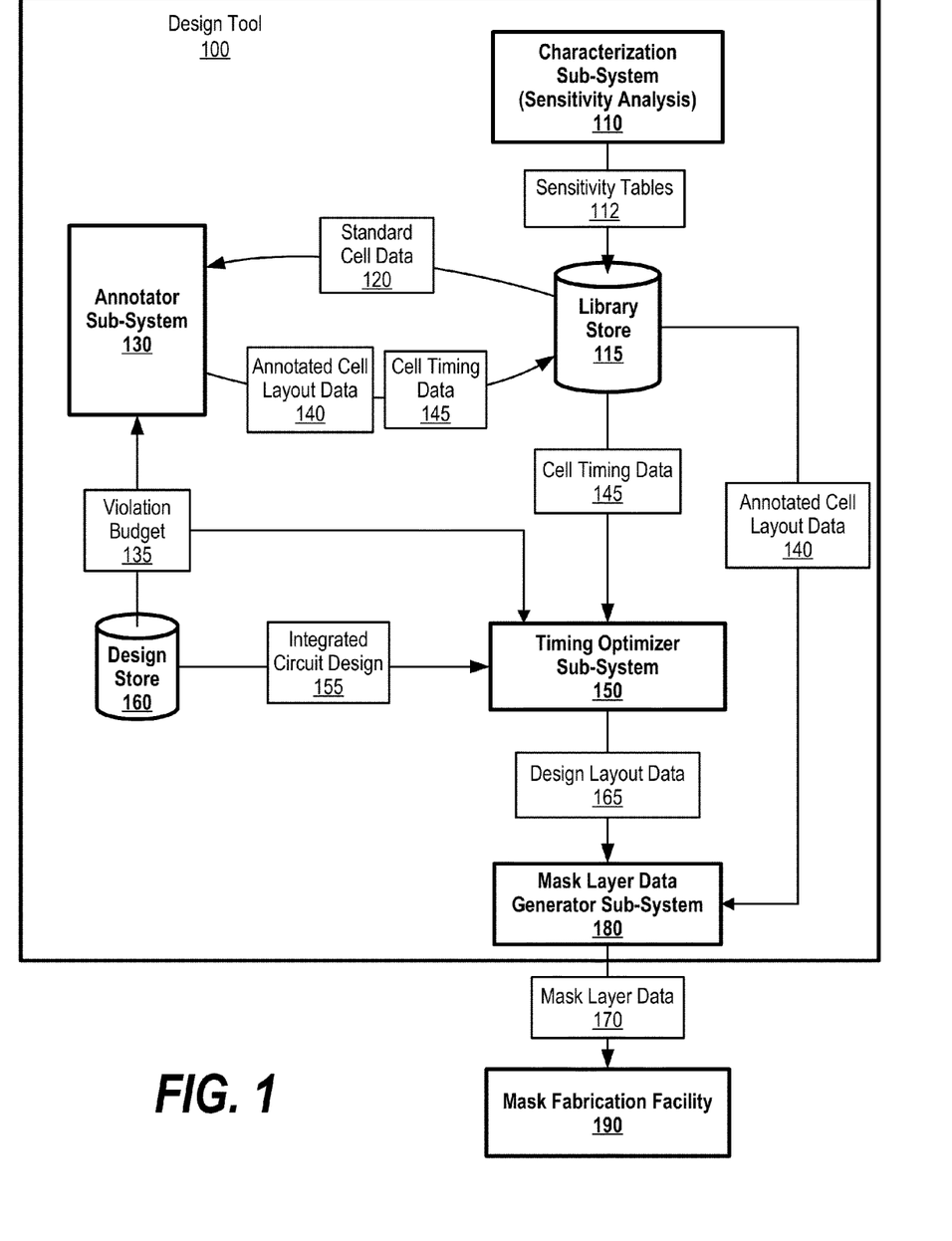
FIG. 1 is a diagram depicting one example of a design tool that creates transistor resize information for a standard cell (e.g., flip-flop) and uses the transistor resize information to resolve timing violations and generate mask layer data accordingly.

FIG. 1 is a flow diagram depicting one example of a design tool that creates transistor resize information for a standard cell (e.g., flip-flop), and uses the transistor resize information to resolve timing violations and generate mask layer data accordingly. The transistor resize information includes resize layout properties of particular transistors (e.g., resized transistor gate object dimensions) and resize timing values corresponding to the resize layout properties (e.g., different setup/hold times) based upon a violation budget.

The example in FIG. 1 shows that design tool 100 is a design tool module, which includes several sub-systems that, in one embodiment, utilize processor(s) and/or design tool circuitry. Design tool 100 includes characterization sub-system 110 that performs sensitivity analysis on a standard cell library (e.g., flip-flop standard cells included in library store 115) and generates sensitivity tables 112 accordingly. Sensitivity analysis involves making small changes in random variation parameters of a standard cell and observing changes in the standard cell's performance metrics during transistor-level SPICE simulations. As described herein, some of the random variation parameters changed during sensitivity analysis correspond to changes in transistor sizes (e.g., different gate lengths, different gate widths, etc.) that, in turn, result in timing changes of the standard cell as discussed above.

Annotator sub-system 130 retrieves standard cell data 120 (includes sensitivity tables 112 and cell layout data) from library store 115 and retrieves violation budget 135 (includes pre-defined setup and hold time tolerances) from design store 160. Annotator sub-system 130 selects a standard cell (e.g., a flip-flop standard cell) for which to create resize information, and identifies transistors within the selected standard cell that reside along paths that affect the timing of the standard cell (i.e. clock paths/data paths). In one embodiment, annotator sub-system 130 performs a Pareto analysis of the identified transistors using transistor sensitivities to rank order the influential transistors that, when changed, adjust the timing within the pre-defined setup and hold time tolerances included in violation budget 135. A Pareto analysis is based on a Pareto Principle (20% of input is responsible for 80% of results) and is a technique for prioritizing possible changes based upon possible outcomes resulting from making the possible changes. In turn, annotator sub-system 130 computes resize timing values based upon the sensitivities of the influential transistors (included in sensitivity tables 112) and stores the resize timing values with default timing values as cell timing data 145.

Standard cell data 120 also includes default layout properties of the standard cells (transistor default object dimensions). For the identified influential transistor discussed above, annotator sub-system 130 generates resize layout properties (transistor resize object dimensions) of their transistor objects (e.g., transistor gate lengths, transistor gate widths, etc.). For example, the resize layout properties of an influential transistor may include a resized gate length of 65 nanometers (nm) (as opposed to a default gate length of 60 nm, see FIGS. 3, 4, 5, and corresponding text for further details). As discussed above, different transistor sizes (resize layout properties) result in different transistor timing (resize timing values). The resize layout properties, however, do not affect the overall area of the standard cell because the resize layout properties are slight changes in size to a few influential transistors. In one embodiment, resize object dimensions are determined based on technology dependent steps of minimum resolution for transistor gate-lengths and transistor gate-widths.

In turn, annotator sub-system 130 stores the resize layout properties in the standard cell layout data's resize layer entries (e.g., marker layer entries), resulting in annotated cell layout data 140 that annotator sub-system 130 stores in library store 115. As a result, and as discussed below, annotated cell layout data 140 and cell timing data 145 may be used during an integrated circuit design's timing optimization and placement/routing stages to generate mask layer data.

Timing optimizer sub-system 150 retrieves integrated circuit design 155 from design store 160, which a circuit designer created utilizing the standard cell library stored in library store 115. In one embodiment, integrated circuit design 155 includes timing information (e.g., parasitic data) generated from a previous physical design stage of the integrated circuit design. Timing optimizer sub-system 150 retrieves cell timing data 145 from library store 115, and performs static timing analysis on integrated circuit design 155 using default timing values for standard cell instances in integrated circuit design 155. When timing optimizer sub-system 150 detects a timing violation that is within timing tolerances of violation budget 135, timing optimizer sub-system 150 replaces default timing values with resize timing values from cell timing data 145 for standard cell instances generating the timing violations (on an individual basis), and re-executes the static timing analysis. If the static timing analysis re-execution passes, timing optimizer sub-system 150 generates resize indicators (e.g., flags) that identify the standard cell instances and the resize timing values utilized to resolve the timing violation. Once timing optimizer sub-system 150 resolves the timing violations, timing optimizer sub-system 150 creates design layout data 165, which includes the resize indicators and other information (placement, interconnection, etc.) to create a mask set for the integrated circuit design.

Mask layer data generator sub-system 180 is responsible for parsing design layout data 165 into respective mask layers. When mask layer data generator sub-system 180 detects a standard cell instance that has a corresponding resize indicator, mask layer data generator sub-system 180 stores the corresponding standard cell's resize layout properties (from annotated cell layout data 140) in the respective mask layer. For example, timing optimizer sub-system 150 may have generated a resize indicator for a specific flip-flop instance "X1," in which case mask layer data generator sub-system 180 retrieves resized gate object dimensions for X1 from resize layers (marker layers) and stores the resized gate object dimensions in an appropriate mask layer for instance "X1" (as opposed to storing default gate object dimensions).

In one embodiment, mask layer data generator sub-system 180 performs pre-fabrication steps with the mask layer data to prepare the data for mask fabrication facility 190, such as performing design rules verification, optical proximity correction algorithms, and etcetera. In turn, mask layer data generator sub-system 180 sends mask layer data 170 to mask fabrication facility 190 to generate a mask set of integrated circuit design 155, which a semiconductor fabrication facility uses to create an integrated circuit.

Figure 2:
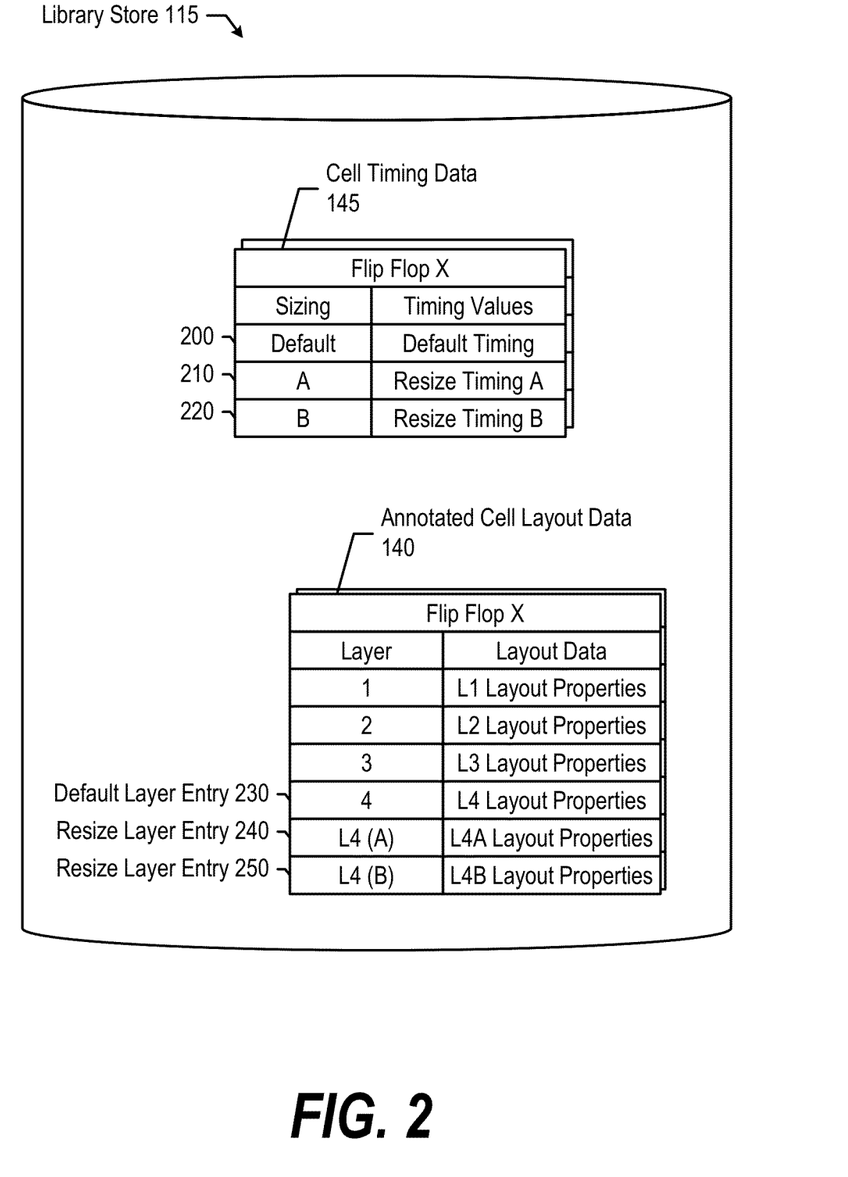
FIG. 2 is a diagram depicting one example of standard cell timing data and annotated standard cell data.

FIG. 2 is a diagram depicting one example of a library storage area that includes cell timing data and annotated cell data of a standard cell. Library store 115 includes cell timing data 145 generated by annotator sub-system 130. Cell timing data 145 includes default timing values in entry 200 and resize timing values in entries 210 and 220. For example, entry 210 may include faster setup timing values and entry 220 may have faster hold timing values. A setup time is the skew (difference) between a fast clock timing path delay and a slow data timing path delay, and a hold time is the skew (difference) between a fast data timing path delay and a slow clock timing path delay.

In one embodiment, entries 210 and 220 may include resize timing values that are absolute in nature (e.g., 5 ps) or a percentage of the default timing values (e.g., 2%). The resize timing values correspond to resize dimensions of one or more of the transistor objects (e.g., gate width of a transistor) included in flip flop X. In one embodiment, resize timing values may be derived from timing tolerances of a previous design's timing data. In another embodiment, multiple possible sizing options may be used by annotator sub-system 130 to determine minimum and maximum tolerances. Several "resize" budgets may be derived using a timing window between the minimum and maximum tolerances included in violation budget 135.

Library store 115 also includes annotated cell layout data 140. Annotated cell layout data 140 includes default layout properties in default layer entries that correspond to particular mask layers. Default layer entry 230 includes default layout properties for layer 4 (e.g., poly layer), which includes transistor object dimensions for various transistor objects included in the flip-flop's clock and/or data paths. Design tool 100 (annotator sub-system 130) creates resize layout properties to increase/decrease the object dimensions of certain transistor objects (e.g., gate lengths, gate widths, etc.) and stores the resize layout properties in resize layer entries 240 and 250. For example, default layer entry 230 may include a gate length of 60 nm (nanometers), while resize layer entries 240-250 may include gate widths of 65 nm and 55 nm, respectively. In one embodiment, resize layer entry 240 may include a different shape compared with default layer entry 230 for layer 4 object resizing.

Figure 6:
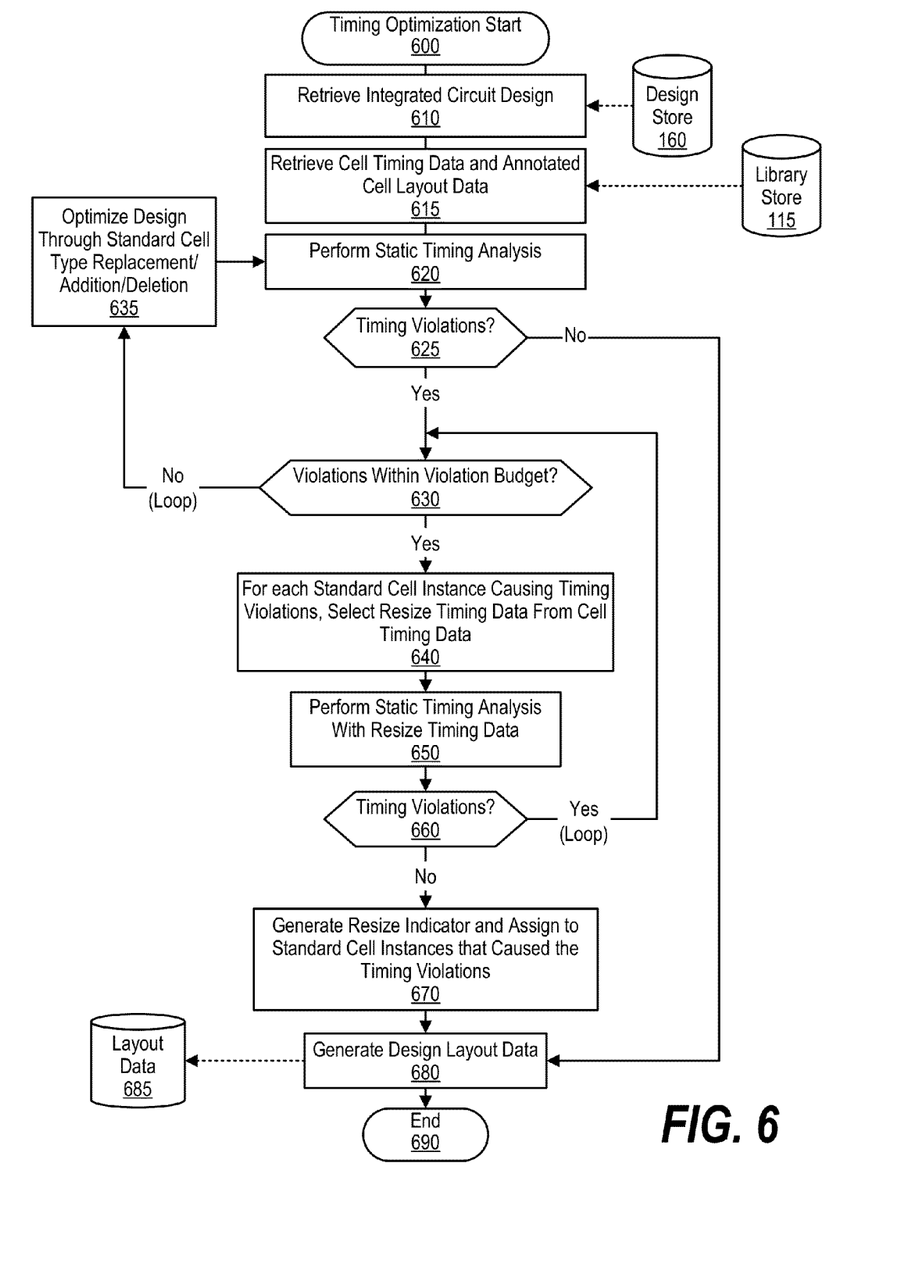
FIG. 6 is a flowchart depicting one example of optimizing timing of an integrated circuit design by utilizing resize timing values to resolve timing violations that are within a violation budget.
Figure 7:
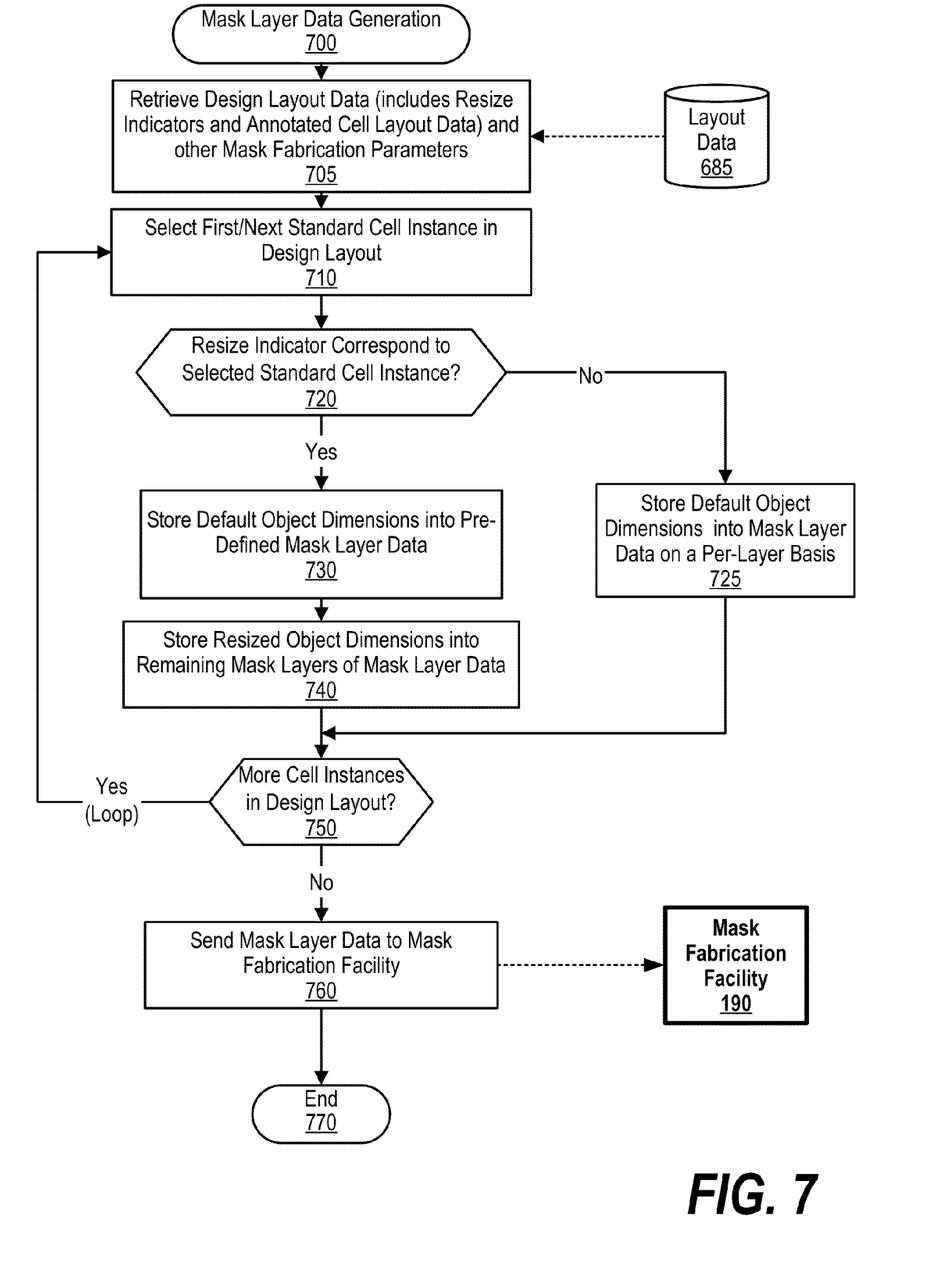
FIG. 7 is a flowchart depicting one example of generating mask layer data based upon default layout properties and resize layout properties of standard cells included in an integrated circuit.

In turn, when design tool 100 (timing optimizer sub-system 150) determines that resize timing values in resize timing entry 210 resolves a timing violation, design tool 100 generates a resize indicator that instructs mask layer data generation sub-system 180 to utilize L4A layout properties in entry 240 for layer 4 object sizing instead of using default object properties in entry 230 (see FIGS. 6-7 and corresponding text for further details).

Figure 3:
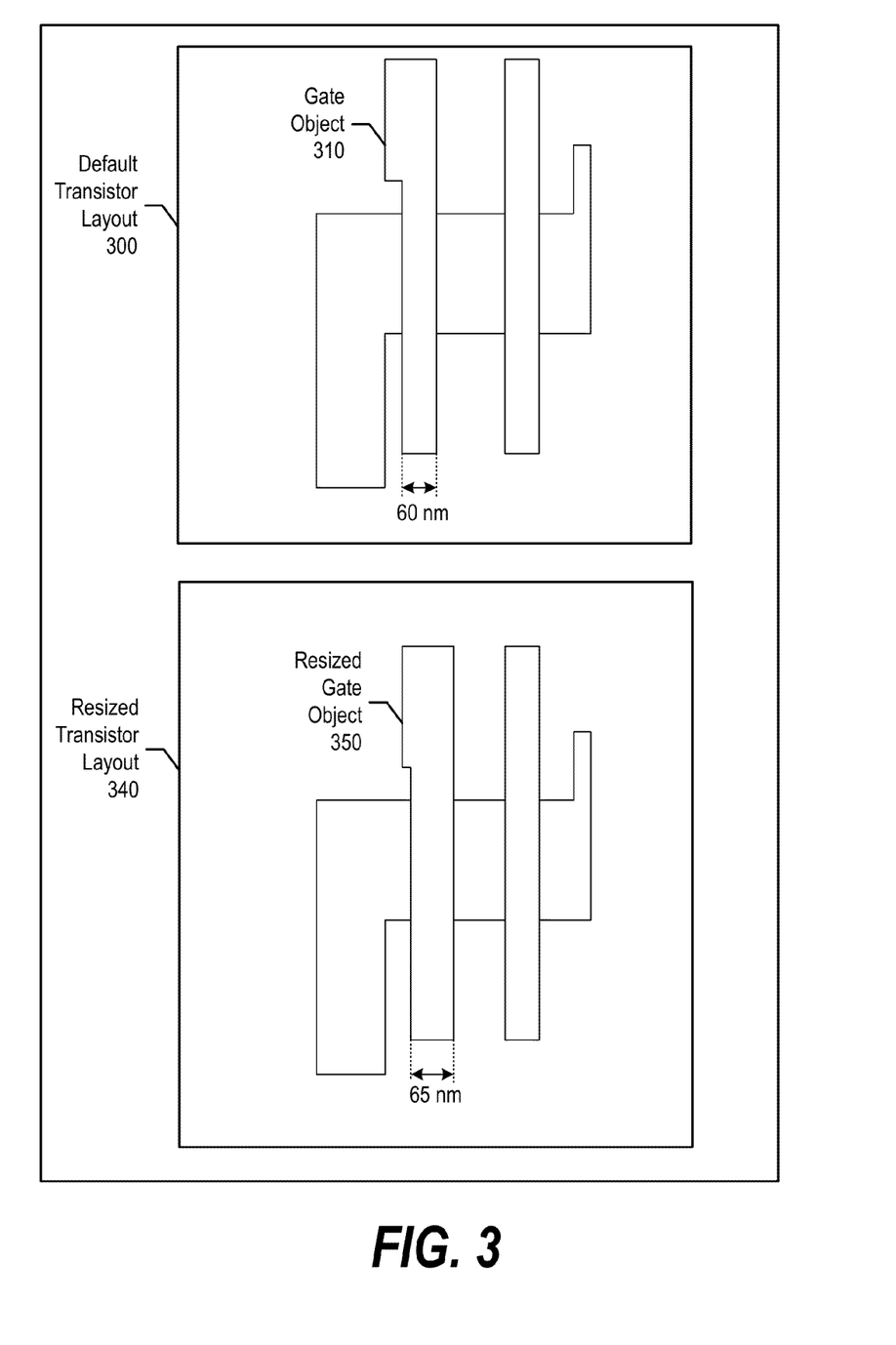
FIG. 3 is a diagram depicting one example of transistor objects generated from default layout properties compared with transistor objects generated from resize layout properties.

FIG. 3 is a diagram depicting examples of transistor objects generated from default layout properties and transistor objects generated from resize layout properties. Default transistor layout 300 includes gate object 310 (poly layer) that has a default gate length of 60 nm. In contrast, resized transistor layout 340's gate object 350 has a gate length of 65 nm. This larger gate changes the timing properties of the transistor. As such, when resized transistor layout 340 is utilized in a flip-flop's timing path, the flip-flop setup or hold times are changed (see FIG. 7 and corresponding text for further details). In one embodiment, annotator sub-system 130 may resize a transistor's gate-width, in which case an active layer (layer below gate object 310) is resized.

The intersection of the poly region and the active region is the transistor gate, and the active region not covering the transistor gate is the transistor's source/drain region. As such, resizing a transistor's source object/drain object (e.g., resizing the active region) along the poly direction has a timing effect on the transistor similar to that of resizing the transistor's gate-width.

Figure 4:
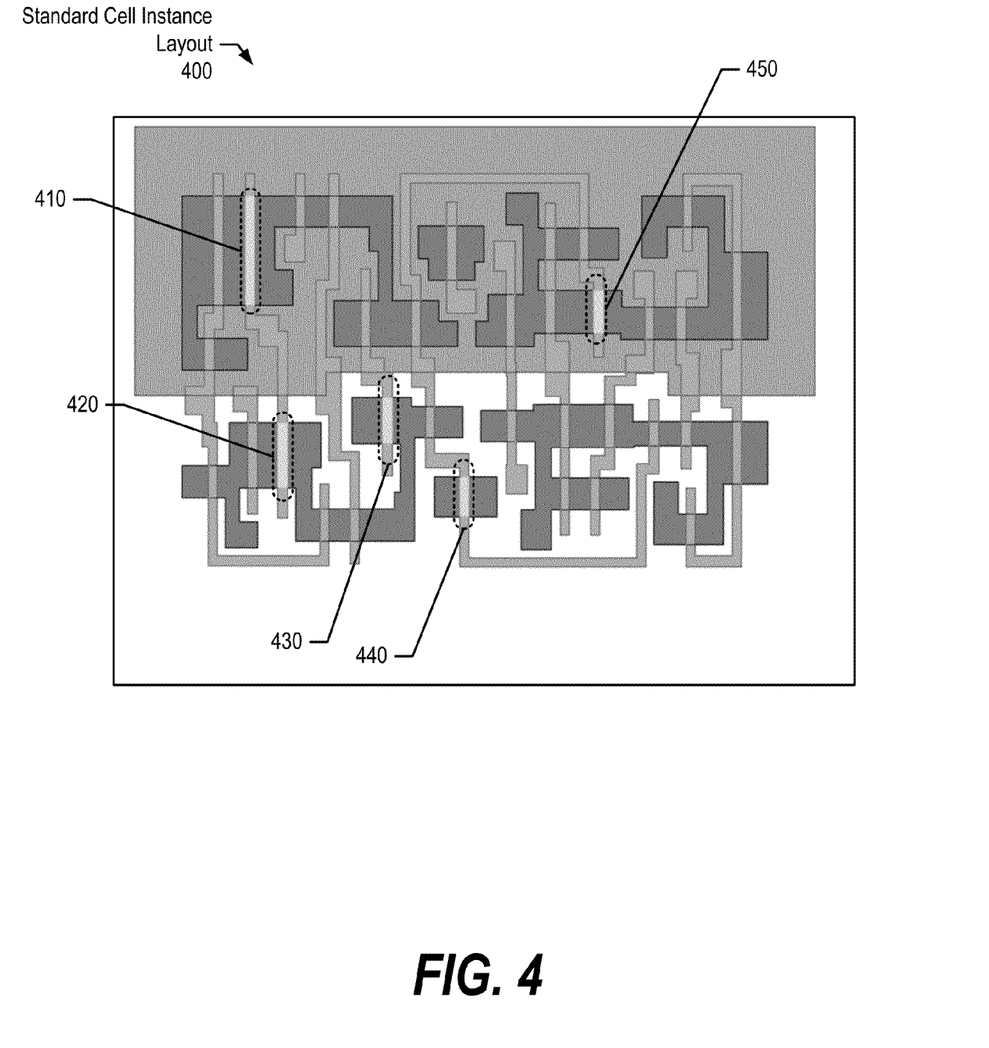
FIG. 4 is a diagram depicting one example of a standard cell flip-flop layout that includes transistor objects generated from resize layout properties.

FIG. 4 is a diagram depicting one example a standard cell layout instance that includes transistor objects generated from resize layout properties. Standard cell instance layout 400 is comprised of multiple transistor objects, many of which correspond to default object dimensions in default layout properties. However, objects 410 through 450 are based upon resize object dimensions in resize layout properties. For example, objects 410 and 420 may be slightly larger than a default object size of a related transistor, and objects 430, 440, and 450 may be slightly smaller than a default object size of a related transistor. As a result, standard cell instance layout 400 produces slightly different setup/hold times (within violation budget 135) compared with a standard cell instance layout created solely by default layout properties, all the while maintaining the same overall layout area. In one embodiment, the number of resized objects and their resizing depend on the timing tolerances specified in violation budget 135.

Figure 5:
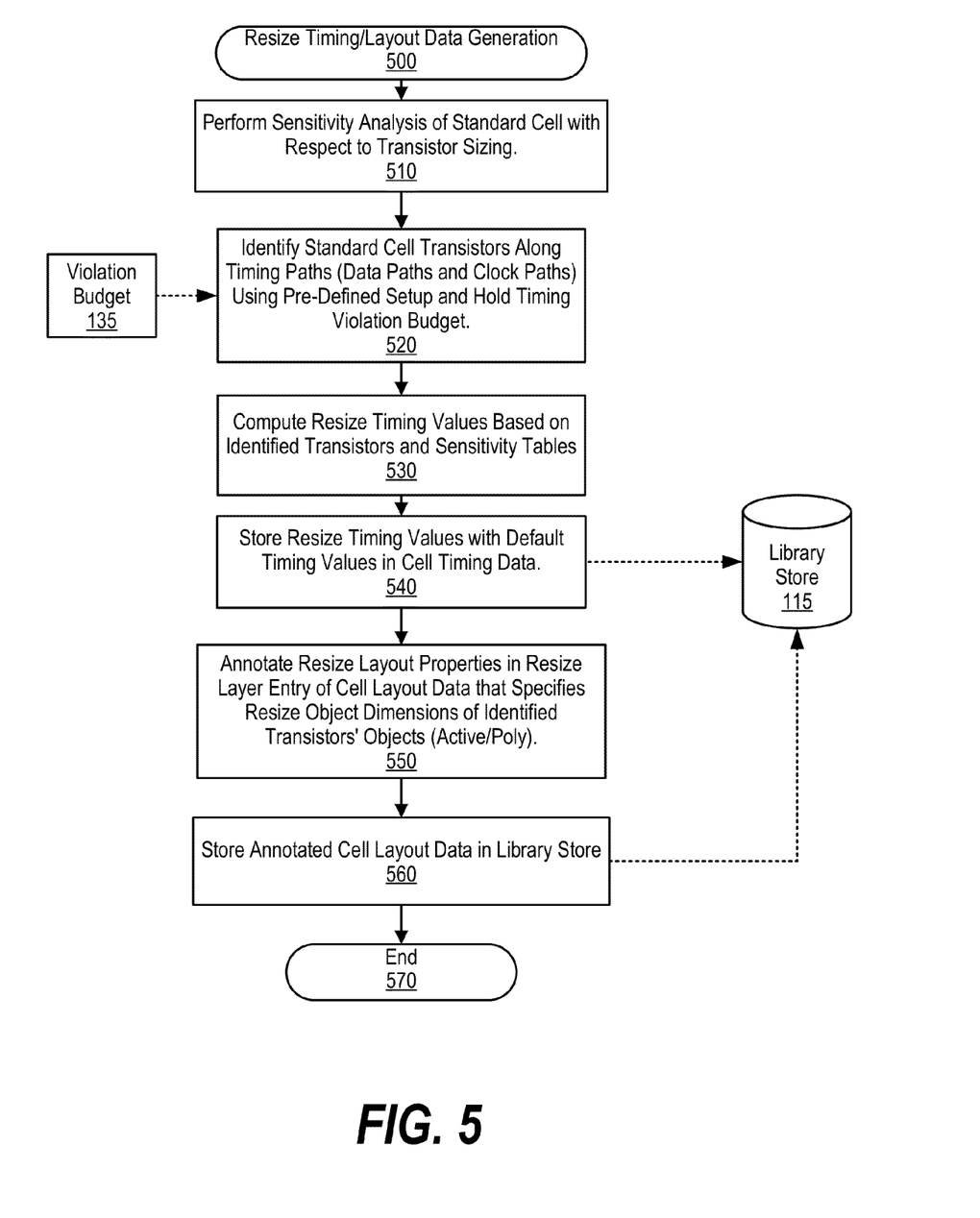
FIG. 5 is a flowchart depicting one example of steps taken to generate resize timing values and transistor resize layout properties of a standard cell.

FIG. 5 is a flowchart depicting one example of steps taken to generate resize timing values and resize layout properties of a standard cell. Processing commences at 500, whereupon at 510 the design tool performs sensitivity analysis on the standard cell, such as performing sensitivity analysis on a flip-flop with respect to transistor sizes as discussed above. At 520, the design tool selects transistors (e.g., via tracing a transistor-level netlist stored in design store 160) within the standard cell that lie on clock and data paths based upon violation budget 135, which includes pre-defined setup and hold timing tolerances. In one embodiment, the design tool performs a Pareto analysis of the selected transistors using corresponding transistor sensitivities to rank order the influential transistors (from the selected transistors) that, when changed, are able to adjust the timing of the standard cell within the pre-defined setup and hold time tolerances included in violation budget 135. In one embodiment, the transistors identified for meeting the setup timing tolerance may be different from those identified for meeting the hold timing tolerance. Next, at 530, the design tool computes resize timing values according to sensitivity data (generated in 510) of the influential transistors. The resize timing values are stored with default timing values as cell timing data 145 in library store 115 (540).

At 550, the design tool annotates resize layout properties (via a layout processing tool) of the identified influential transistors into resize layer entries within the standard cell's cell layout data, all without affecting the overall layout area of the standard cell (resize layout properties 220 shown in FIG. 2). The resize layout properties may include a larger gate length/width or smaller gate length/width of transistor objects within the standard cell's clock path and/or data path. In one embodiment, the resize layout properties may include layers in addition to poly or active layers. For example, when an active layer is resized, the contacts and metal layer may also change properties. These changes are also stored in the resize layout properties.

In one example, the standard cell may represent a multi-bit flip-flop with multiple timing paths with different performance/frequency requirements. Since the multi-bit flop-flop has multiple timing paths with different performance/frequency requirements, design tool 100 marks influential transistors along a higher frequency requirement path with a higher priority ("priority 1") and marks influential transistors along a lower frequency requirement path with a lower priority ("priority 2"). In this embodiment, for example, when the data setup path within the flip-flop requires higher performance criteria, transistors marked as higher priority (priority 1) will be first selected to resize without impacting the standard cell area. If all priority 1 transistors are already selected and the violation budget is not reached, then some or all priority 2 transistors may be selected to resize, all without impacting the overall standard cell area (no increase in the standard cell area).

At 560, the annotated cell layout data is stored in library store 115 for use with subsequent integrated circuit design development (see FIGS. 6-7 and corresponding text for further details). Processing ends at 570.

FIG. 6 is a flowchart depicting one example of optimizing integrated circuit design timing by utilizing resize timing values to resolve timing violations within a violation budget. Processing commences at 600, whereupon the design tool retrieves an integrated circuit design from design store 160, such as integrated circuit design 155 shown in FIG. 1 (610). At 615, the design tool retrieves cell timing data and annotated cell layout data from library store 115 of a standard cell library utilized by the integrated circuit design.

Next, the design tool performs static timing analysis of the integrated circuit design using default timing values included in the cell timing data (620). A decision is made as to whether the static timing analysis generated timing violations (decision 625). If the static timing analysis did not generate timing violations, decision 625 branches to the "No" branch, whereupon the design tool generates design layout data that includes layout information of standard cells along with placement and routing (interconnection) information (680).

On the other hand, if the static timing analysis generates a timing violation, decision 625 branches to the "Yes" branch, whereupon a determination is made as to whether the timing violation is within a violation budget (decision 630). In one embodiment, the design tool identifies a flip-flop instance causing the timing violation and analyzes the corresponding standard cell's violation budget (e.g., +/−40 ps). If the timing violation is not within the violation budget, decision 630 branches to the "No" branch, whereupon the design tool replaces/adds/deletes standard cells as needed to resolve the timing violation (635). For example, a set up timing violation may be severe and the timing optimizer may need to add a buffer to the integrated circuit design to resolve the timing violation.

On the other hand, if the timing violation is within the violation budget, decision 630 branches to the "Yes" branch, whereupon the design tool selects the resize timing values included in cell timing data 145 corresponding to the standard cell instances that cause the timing violations (640).

At 650, the design tool re-executes the static timing analysis using the resize timing values. If the re-execution does not resolve the timing violations, decision 660 branches to the "Yes" branch, whereupon the design tool determines once again whether the timing violations are within the violation budget (decision 630). In one embodiment, if a flip-flop instance was already chosen for resizing, then it is marked and not used for resizing in the next iteration and a different instance(s) may be chosen to fix timing violations within the violation budget. This looping continues until the timing violations are resolved, at which point decision 660 branches to the "No" branch, whereupon the design tool generates and assigns resize indicators for standard cell instances whose timing values were changed to resolve the timing violations (670). The resize indicators instruct a mask layer data generator sub-system (discussed below) to use resize layout properties during mask layer data generation for specific standard cell instances instead of using default layout properties for the specific standard cell instances (see FIG. 7 and corresponding text for further details).

At 680, the design tool generates and stores design layout data that includes resize indicators, standard cell placement information, routing information, and standard cell layout information into layout data store 685. Processing ends at 690.

FIG. 7 is a flowchart depicting one example of steps taken to generate mask layer data based upon default layout properties and resize layout properties of standard cells. Processing commences at 700, whereupon the design tool retrieves design layout data, annotated cell layout data, and resize indicators from layout data store 685 (705). At 710, the design tool selects the first standard cell instance in the design layout, and a determination is made as to whether the cell instance corresponds to a resize indicator (720). If the cell instance does not correspond to a resize indicator, decision 720 branches to the "No" branch, whereupon the design tool places transistor objects on a per-layer basis for the standard cell according to default layout properties of the standard cell (725).

On the other hand, if the standard cell instance corresponds to a resize indicator, decision 720 branches to the "Yes" branch, whereupon the layer processing tool places transistor objects not corresponding to the resize indictor into pre-defined mask layer data (730), and places transistor objects corresponding to the resize indicator into their corresponding layers. For example, referring to FIG. 2, the design tool stores L4A layout properties (240) into mask layer 4 data.

A determination is made as to whether there are more standard cell instances in the design layout to process (750). If there are more standard cell instances to process, decision 750 branches to the "Yes" branch, which loops back to select and process the next standard cell instance. This looping continues until there are no more standard cell instances to process, at which point decision 750 branches to the "No" branch.

At step 760, the design tool sends the mask layer data to mask fabrication facility 190. The mask layer data includes, on a per-layer basis, transistor objects generated based upon default layout properties as well as transistor objects generated based upon resize layout properties. Processing ends at 770.

According to one embodiment of the present disclosure, a design tool system executes static timing analysis of an integrated circuit design using a first set of timing values. The first set of timing values corresponding to a first set of layout properties of a transistor included in a standard cell utilized by the integrated circuit design. The design tool system detects that the static timing analysis generates a timing violation, and re-executes the static timing analysis of the integrated circuit using a second set of timing values, which correspond to a second set of layout properties of the transistor. In turn, the design tool system re-executes the static timing analysis and generates mask layer data that includes the second set of layout properties in response to a determination that the re-execution of the static timing analysis using the second set of timing values resolves the timing violation.

According to another embodiment of the present disclosure, the mask layer data is configured to generate multiple masks that are subsequently used by a fabrication facility to create an integrated circuit corresponding to the integrated circuit design on a semiconductor wafer.

According to yet another embodiment of the present disclosure, an overall layout area of the standard cell is unchanged by using the second set of layout properties instead of the first set of layout properties.

According to yet another embodiment of the present disclosure, the first set of layout properties is stored in a default layer entry included in cell layout data of the standard cell. Prior to the static timing analysis execution, the design tool system determines that the transistor is included in a timing path in the standard cell selected from the group consisting of a clock path and a data path. The design tool system then generates the second set of layout properties in response to determining that the transistor is included in the timing path, and stores the second set of layout properties into a resize layer entry included in the cell layout data, resulting in annotated cell layout data of the standard cell that includes both the first set of layout properties and the second set of layout properties.

According to yet another embodiment of the present disclosure, the timing violation corresponds to a standard cell instance of the standard cell. During re-execution of the static timing analysis, the design tool system assigns a resize indicator to the standard cell instance in response to the resolution of the timing violation. During the generation of the mask layer data, the design tool system detects the resize indicator and retrieves the second set of layout properties from the resize layer entry. In turn, the design tool system includes the retrieved second set of layout properties in a corresponding one of a plurality of mask layers.

According to yet another embodiment of the present disclosure, the design tool system utilizes the first set of timing values during the re-execution of the static timing analysis for a different standard cell instance of the standard cell, the different standard cell instance included in the integrated circuit design at a location different than the standard cell instance.

According to yet another embodiment of the present disclosure, the transistor includes a multiple transistor objects such as a gate object, a source object, and a drain object. In this embodiment, the second set of layout properties includes resize object dimensions of a selected one of the plurality of transistor objects that are different than default object dimensions of the selected transistor object included in the first set of layout properties.

According to yet another embodiment of the present disclosure, the mask layer data corresponds to a plurality of mask layers each corresponding to one of a plurality of physical layers on a semiconductor wafer, and wherein the second set of layout properties is utilized during creation of at least one of the plurality of physical layers on the semiconductor wafer.

According to yet another embodiment of the present disclosure, the standard cell corresponds to a multi-bit flip flop and the design tool system assigns a first priority and a second priority to a first subset of transistors and a second subset of transistors corresponding to a first timing path and a second timing path. In this embodiment, the design tool system uses sensitivities of the first priority transistors to reach resize timing values up to the violation budget.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, a software embodiment (including firmware, resident software, micro-code, etc.), including processing circuitry for executing thereof, or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program, in a non-transitory fashion, for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
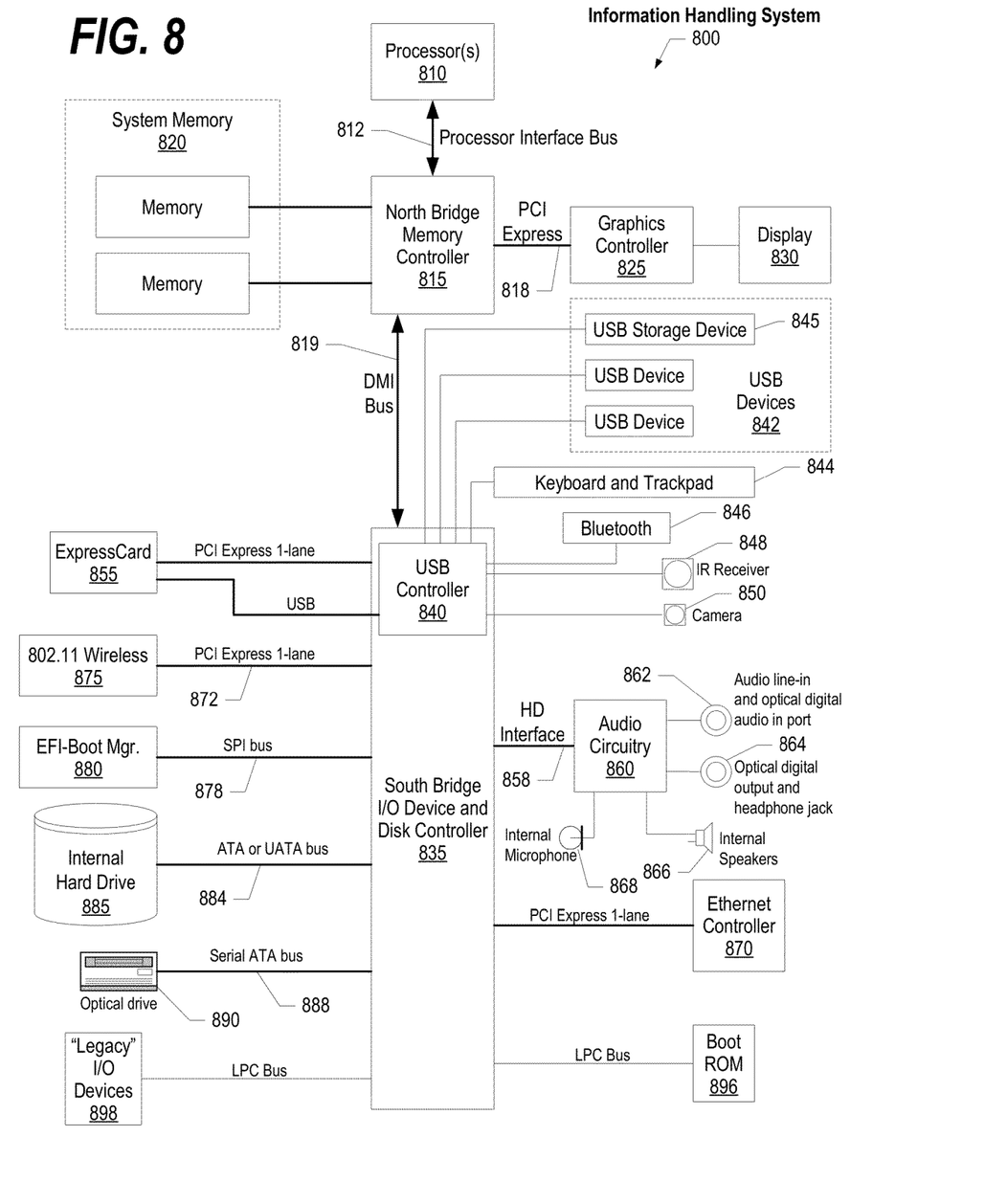
FIG. 8 is a block diagram of a data processing system in which the methods described herein can be implemented.

FIG. 8 illustrates information handling system 800, which is a simplified example of a computer system capable of performing the computing operations described herein. Information handling system 800 includes one or more processors 810 coupled to processor interface bus 812. Processor interface bus 812 connects processors 810 to Northbridge 815, which is also known as the Memory Controller Hub (MCH). Northbridge 815 connects to system memory 820 and provides a means for processor(s) 810 to access the system memory. Graphics controller 825 also connects to Northbridge 815. In one embodiment, PCI Express bus 818 connects Northbridge 815 to graphics controller 825. Graphics controller 825 connects to display device 830, such as a computer monitor.

Northbridge 815 and Southbridge 835 connect to each other using bus 819. In one embodiment, the bus is a Direct Media Interface (DMI) bus that transfers data at high speeds in each direction between Northbridge 815 and Southbridge 835. In another embodiment, a Peripheral Component Interconnect (PCI) bus connects the Northbridge and the Southbridge. Southbridge 835, also known as the I/O Controller Hub (ICH) is a chip that generally implements capabilities that operate at slower speeds than the capabilities provided by the Northbridge. Southbridge 835 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 896 and "legacy" I/O devices (using a "super I/O" chip). The "legacy" I/O devices (898) can include, for example, serial and parallel ports, keyboard, mouse, and/or a floppy disk controller. The LPC bus also connects Southbridge 835 to Trusted Platform Module (TPM) 895. Other components often included in Southbridge 835 include a Direct Memory Access (DMA) controller, a Programmable Interrupt Controller (PIC), and a storage device controller, which connects Southbridge 835 to nonvolatile storage device 885, such as a hard disk drive, using bus 884.

ExpressCard 855 is a slot that connects hot-pluggable devices to the information handling system. ExpressCard 855 supports both PCI Express and USB connectivity as it connects to Southbridge 835 using both the Universal Serial Bus (USB) the PCI Express bus. Southbridge 835 includes USB Controller 840 that provides USB connectivity to devices that connect to the USB. These devices include webcam (camera) 850, infrared (IR) receiver 848, keyboard and trackpad 844, and Bluetooth device 846, which provides for wireless personal area networks (PANs). USB Controller 840 also provides USB connectivity to other miscellaneous USB connected devices 842, such as a mouse, removable nonvolatile storage device 845, modems, network cards, ISDN connectors, fax, printers, USB hubs, and many other types of USB connected devices. While removable nonvolatile storage device 845 is shown as a USB-connected device, removable nonvolatile storage device 845 could be connected using a different interface, such as a Firewire interface, etcetera.

Wireless Local Area Network (LAN) device 875 connects to Southbridge 835 via the PCI or PCI Express bus 872. LAN device 875 typically implements one of the IEEE 802.11 standards of over-the-air modulation techniques that all use the same protocol to wireless communicate between information handling system 800 and another computer system or device. Optical storage device 890 connects to Southbridge 835 using Serial ATA (SATA) bus 888. Serial ATA adapters and devices communicate over a high-speed serial link. The Serial ATA bus also connects Southbridge 835 to other forms of storage devices, such as hard disk drives. Audio circuitry 860, such as a sound card, connects to Southbridge 835 via bus 858. Audio circuitry 860 also provides functionality such as audio line-in and optical digital audio in port 862, optical digital output and headphone jack 864, internal speakers 866, and internal microphone 868. Ethernet controller 870 connects to Southbridge 835 using a bus, such as the PCI or PCI Express bus. Ethernet controller 870 connects information handling system 800 to a computer network, such as a Local Area Network (LAN), the Internet, and other public and private computer networks.

While FIG. 8 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A system comprising:
one or more processors;
a memory accessible by the one or more processors;
a design tool module executed by at least one of the one or more processors and configured to:
create a standard cell that includes a first set of layout properties and a second set of layout properties of a transistor included in a timing path in the standard cell, wherein the second set of layout properties is stored into a resize layer entry of annotated cell layout data associated with the standard cell;
execute a first static timing analysis of an integrated circuit design using a first set of timing values, the first set of timing values corresponding to the first set of layout properties of the transistor included in the standard cell utilized by the integrated circuit design;
execute a second static timing analysis of the integrated circuit design using a second set of timing values in response to a detection that the first static timing analysis generates a timing violation, the second set of timing values corresponding to the second set of layout properties of the transistor included in the standard cell; and generate mask layer data that includes the second set of layout properties in response to a determination that the second static timing analysis resolves the timing violation, wherein the mask layer data is configured to generate a plurality of masks for construction of an integrated circuit corresponding to the integrated circuit design.

2. The system of claim 1 wherein an overall layout area of the standard cell is unchanged by using the second set of layout properties included in the mask layer data instead of using the first set of layout properties.

3. The system of claim 1 wherein, prior to execution of the first static timing analysis, the design tool module is further configured to:

determine that the transistor is included in a timing path in the standard cell selected from the group consisting of a clock path and a data path; and generate the second set of layout properties in response to determining that the transistor is included in the timing path.

4. The system of claim 1 wherein the first set of layout properties is stored in a default layer entry, and wherein both the resizer layer entry and the default layer entry correspond to a same mask layer.

5. The system of claim 1 wherein the timing violation corresponds to a standard cell instance of the standard cell, the design tool module further configured to:

assign a resize indicator to the standard cell instance in response to resolution of the timing violation;

detect the assigned resize indicator during generation of the mask layer data;

retrieve the second set of layout properties from the resize layer entry in response to the detection of the assigned resize indicator; and include the retrieved second set of layout properties in a corresponding one of a plurality of mask layers.

6. The system of claim 5 wherein the design tool module is further configured to:

utilize the first set of timing values during execution of the second static timing analysis for a different standard cell instance of the standard cell, the different standard cell instance included in the integrated circuit design at a location different than the standard cell instance.

7. The system of claim 1 wherein the design tool module is further configured to perform the first static timing analysis using parasitic data generated from a physical design stage of the integrated circuit design.

8. The system of claim 1 wherein:

the transistor comprises a plurality of transistor objects selected from the group consisting of a gate object, a source object, and a drain object; and the second set of layout properties includes resize object dimensions of a selected one of the plurality of transistor objects that are different than default object dimensions of the selected transistor object included in the first set of layout properties.

9. The system of claim 1 wherein the standard cell corresponds to a multi-bit flip flop that includes a first timing path and a second timing path, and wherein, prior to the executing of the static timing analysis, the design tool circuitry is further configured to:

select a subset of transistors corresponding to the first timing path; and utilize the selected subset of transistors to generate the second set of timing values and the second set of layout properties, the transistor included in the selected subset of transistors.

10. A method comprising:

creating a standard cell that includes a first set of layout properties and a second set of layout properties of a transistor included in a timing path in the standard cell, wherein the second set of layout properties is stored into a resize layer entry of annotated cell layout data associated with the standard cell;

performing a first static timing analysis of an integrated circuit design using a first set of timing values corresponding to the first set of layout properties of the transistor included in the standard cell utilized by the integrated circuit design;

selecting a second set of timing values in response to a timing violation from the first static timing analysis, wherein the second set of timing values correspond to the second set of layout properties of the transistor included in the standard cell;

performing a second static timing analysis using the second set of timing values; and generating mask layer data that includes the second set of layout properties in response to a determination that the second static timing analysis resolves the timing violation, wherein the mask layer data is configured to generate a plurality of masks for construction of an integrated circuit corresponding to the integrated circuit design.

11. The method of claim 10 wherein an overall layout area of the standard cell is unchanged by using the second set of layout properties included in the mask layer data instead of the first set of layout properties.

12. The method of claim 10 wherein, prior to performing the first static timing analysis, the method further comprises:

determining that the transistor is included in a timing path in the standard cell selected from the group consisting of a clock path and a data path; and generating the second set of layout properties in response to determining that the transistor is included in the timing path.

13. The method of claim 10 wherein the first set of layout properties is stored in a default layer entry, and wherein both the resizer layer entry and the default layer entry correspond to a same mask layer.

14. The method of claim 10 wherein the timing violation corresponds to a standard cell instance of the standard cell, the method further comprising:

assigning a resize indicator to the standard cell instance in response to resolution of the timing violation;

detecting the assigned resize indicator during generation of the mask layer data;

retrieving the second set of layout properties from the resize layer entry in response to the detection of the assigned resize indicator; and including the retrieved second set of layout properties in a corresponding one of a plurality of mask layers.

15. The method of claim 14 further comprising:

utilizing the first set of timing values during performing the second static timing analysis for a different standard cell instance of the standard cell, the different standard cell instance included in the integrated circuit design at a location different than the standard cell instance.

16. The method of claim 10 wherein the first static timing analysis uses parasitic data generated from a physical design stage of the integrated circuit design.

17. The method of claim 10 wherein:
   the transistor comprises a plurality of transistor objects selected from the group consisting of a gate object, a source object, and a drain object; and
   the second set of layout properties includes resize object dimensions of a selected one of the plurality of transistor objects that are different than default object dimensions of the selected transistor object included in the first set of layout properties.

18. The method of claim 10 wherein the standard cell corresponds to a multi-bit flip flop that includes a first timing path and a second timing path, and wherein, prior to the executing of the static timing analysis, the method further comprises:
   selecting a subset of transistors corresponding to the first timing path; and
   utilizing the selected subset of transistors to generate the second set of timing values and the second set of layout properties, the transistor included in the selected subset of transistors.

19. A computer program product stored in a computer readable storage medium, comprising computer program code that, when executed by an information handling system, causes the information handling system to perform actions comprising:
   creating a standard cell that includes a first set of layout properties and a second set of layout properties of a transistor included in a timing path in the standard cell, wherein the second set of layout properties is stored into a resize layer entry of annotated cell layout data associated with the standard cell;
   performing a first static timing analysis of an integrated circuit design using a first set of timing values corresponding to the first set of layout properties of the transistor included in the standard cell utilized by the integrated circuit design;
   selecting a second set of timing values in response to a timing violation from the first static timing analysis, wherein the second set of timing values correspond to the second set of layout properties of the transistor included in the standard cell;
   performing a second static timing analysis using the second set of timing values; and
   generating mask layer data that includes the second set of layout properties in response to a determination that the second static timing analysis resolves the timing violation, wherein the mask layer data is configured to generate a plurality of masks for construction of an integrated circuit corresponding to the integrated circuit design.

* * * * *